United States Patent
Kikuchi et al.

(10) Patent No.: US 9,963,604 B2
(45) Date of Patent: May 8, 2018

(54) INKJET INK

(71) Applicants: TOSHIBA TEC KABUSHIKI KAISHA, Shinagawa-ku, Tokyo (JP); SYSTEM TOTO CO., LTD, Taito-ku, Tokyo (JP)

(72) Inventors: Keiichi Kikuchi, Fujisawa (JP); Yoshiaki Mochizuki, Fuji (JP); Hiroshi Masaoka, Tokyo-to (JP)

(73) Assignees: TOSHIBA TEC KABUSHIKI KAISHA, Tokyo (JP); SYSTEM TOTO CO., LTD, Tokyo (JP)

( * ) Notice: Subject to any disclaimer, the term of this patent is extended or adjusted under 35 U.S.C. 154(b) by 0 days. days.

(21) Appl. No.: 14/298,016

(22) Filed: Jun. 6, 2014

(65) Prior Publication Data

US 2014/0371358 A1 Dec. 18, 2014

(30) Foreign Application Priority Data

Jun. 17, 2013 (JP) ................. 2013-126802

(51) Int. Cl.
*C09D 11/322* (2014.01)
*C08K 9/06* (2006.01)

(52) U.S. Cl.
CPC .............. *C09D 11/322* (2013.01); *C08K 9/06* (2013.01)

(58) Field of Classification Search
CPC .................................................. C09D 11/322
USPC ........................................................ 523/160
See application file for complete search history.

(56) References Cited

U.S. PATENT DOCUMENTS

| 8,574,357 | B2 | 11/2013 | Kagata et al. |
| 8,702,861 | B2 | 4/2014 | Kagata et al. |
| 2001/0025080 | A1* | 9/2001 | Kobayashi ........... C09D 201/00 524/588 |
| 2009/0075036 | A1* | 3/2009 | Itano et al. ................. 428/195.1 |
| 2010/0022078 | A1* | 1/2010 | Rockenberger .......... C09D 5/24 438/585 |
| 2010/0183809 | A1 | 7/2010 | Oyanagi et al. |
| 2010/0242789 | A1* | 9/2010 | Sano et al. .................... 106/31.9 |
| 2010/0256284 | A1 | 10/2010 | Kagata et al. |
| 2010/0279083 | A1* | 11/2010 | Trummer ............. C09D 11/101 428/195.1 |
| 2010/0289859 | A1 | 11/2010 | Oyanagi et al. |
| 2011/0025783 | A1 | 2/2011 | Oyanagi et al. |
| 2013/0068130 | A1 | 3/2013 | Kagata et al. |
| 2014/0071209 | A1 | 3/2014 | Mochizuki et al. |

FOREIGN PATENT DOCUMENTS

| JP | 4358897 | 11/2009 |
| JP | 2010-168411 | 8/2010 |
| JP | 2010-168412 | 8/2010 |
| JP | 2010-202709 | 9/2010 |
| JP | 2010-2020709 | * 9/2010 |
| JP | 2010-265422 | 11/2010 |
| JP | 2011-132483 | 7/2011 |
| JP | 2012-001581 | 1/2012 |
| JP | 2012-122028 | 6/2012 |
| JP | 2013-064053 | 4/2013 |
| JP | 2014-074127 | 4/2014 |

OTHER PUBLICATIONS

Machine translation of JP 2010-202709.*
Office Action of Notification of Reason(s) for Refusal for Japanese Patent Application No. 2013-126802 dated May 12, 2015, 7 pages.
Japanese Office Action for Japanese Patent Application No. 2013-126802 dated Aug. 4, 2015.

* cited by examiner

*Primary Examiner* — Doris L Lee
(74) *Attorney, Agent, or Firm* — Amin, Turocy & Watson LLP

(57) ABSTRACT

According to one embodiment, an inkjet ink includes a non-conductive metal pigment, a resin, and a solvent, and the surface of the non-conductive metal pigment is coated with an alkoxide including an alkoxysilane, and the coating film has a crosslinked structure.

15 Claims, No Drawings

INKJET INK

CROSS-REFERENCE TO RELATED APPLICATION

This application is based upon and claims the benefit of priority from Japanese Patent Application 2013-126802 filed on Jun. 17, 2013, the entire contents of which are incorporated herein by reference.

FIELD

Embodiments described herein relate generally to an ink to be used in an inkjet recording apparatus, particularly to an ink containing a metal pigment and capable of being preferably used in an apparatus using a piezoelectric system.

BACKGROUND

As an inkjet head of an inkjet recording apparatus, those using various discharging systems are known. For example, a piezoelectric inkjet head discharges an ink by electrical oscillation of a piezoelectric element in an ink chamber.

In the piezoelectric system, an electrical charge necessary for discharging an ink is applied to a piezoelectric element, and therefore, an ink containing a highly electrically conductive pigment such as a metal powder typified by a metallic ink is affected by the electrical charge and cannot be discharged normally, or the piezoelectric element itself is broken down due to electrical conduction in the ink in some cases.

On the other hand, a pigment composed of a metal to be blended in a metallic ink or the like is required to have brightness. However, for example, a pigment or the like composed of a metal containing aluminum as a main component easily reacts with water or the like in the air, and therefore has disadvantages that the metallic luster is deteriorated, the color is changed, hydrogen gas is generated, and so on. As those which solve the disadvantages, there is known a surface-coated aluminum pigment which is obtained by coating the surface of aluminum with a coating film containing an alkoxysilane as a main component, and therefore has water resistance and the like while maintaining brightness.

DETAILED DESCRIPTION

Reference will now be made in detail to the present embodiment of the invention, an example of which is illustrated in the accompanying drawing.

In view of the above problems, the present inventors made intensive studies, and as a result found that by coating the surface of a pigment composed of a metal (hereinafter referred to as "metal pigment") with a continuous dense coating film composed mainly of an alkoxide containing Si, the electrical conductivity of the metal pigment can be largely decreased while maintaining metallic luster, and thus completed the invention.

The inkjet ink of this embodiment contains a non-conductive metal pigment, a resin, and a solvent, and has characteristics that the surface of the non-conductive metal pigment is coated with an alkoxide including an alkoxysilane, and the coating film has a crosslinked structure.

Hereinafter, the configuration of the inkjet ink according to this embodiment will be described in detail.

The inkjet ink according to this embodiment is an ink containing a non-conductive metal pigment, a resin, and a solvent, and on the surface of the non-conductive metal pigment, a coating film having a crosslinked structure formed of an alkoxide including an alkoxysilane is formed. The metal pigment to be applied to the ink according to this embodiment is particularly useful for metal pigments, which have poor environmental resistance such as water resistance, and in which the metallic luster is easily impaired.

In general, an alkoxysilane chemically reacts with a compound having active hydrogen and is degenerated. Since an alkoxysilane is present stably in a solvent having no active hydrogen, and therefore an alkoxysilane is selectively adsorbed on a metal surface, and a hydroxy group and adsorbed water directly attached to a metal atom on the metal surface each serves as a start point, and a mild dealcoholization reaction proceeds so that the alkoxysilane reacts with the metal surface, and also the reaction product repeats three-dimensional crosslinking. The obtained three-dimensionally crosslinked product is considered to form a dense and uniform coating film on the surface of the metal pigment.

Accordingly, the metal pigment having the above-described coating film formed thereon is considered to have characteristics that a decrease in brightness intrinsic to the metal pigment is small, and the surface activity can be decreased.

[Non-Conductive Metal Pigment]

The non-conductive metal pigment according to this embodiment can be obtained by treating the surface of a metal pigment in a treatment solution containing as essential components, at least an alkoxysilane represented by the general formula (1) or an organoalkoxysilane represented by the general formula (2), and an organic solvent having no active hydrogen, and a dealcoholization catalyst.

In this embodiment, an aluminum pigment composed mainly of aluminum is used as the metal pigment. The aluminum pigment to be used is not particularly limited, however, a pigment obtained by rolling an aluminum fine powder into a scaly (flaky) shape by a known method, a pigment obtained by grinding a deposited aluminum foil into a scaly (flaky) shape, and the like are preferred because when the pigment after coating is converted to a powder or the like by pulverization, the pigment is cracked in the thinner direction, and therefore, a decrease in the coating ratio can be prevented as much as possible. In particular, the surface of a deposited aluminum foil flake is smooth, and a high brightness is obtained, and further, the thickness is 0.1 µm or less, which is very small, and therefore, the deposited aluminum foil flake is preferred.

As such an aluminum pigment, for example, one formed into a paste containing a solid content of 10 to 80% by mass with a hydrocarbon solvent such as mineral spirit or xylene, an ester solvent such as ethyl acetate or isopropyl acetate, or the like can be used. As a commercially available product, for example, an aluminum paste 5660NS (trade name, manufactured by Toyo Aluminium K.K.), METASHEEN 71-0010 (trade name, manufactured by Ciba Japan K.K.), or SILVERSHINE P-4100 (trade name, manufactured by BYK-Chemie Japan) can be used. Incidentally, when an ink containing a metal pigment is formed, the metal pigment is hardly ground to an average particle diameter of 0.4 µm or less. In this embodiment, the average particle diameter of the metal pigment is preferably in the range from 0.4 µm to 1.5 µm.

(Compound Represented by General Formula (1))

Examples of the alkoxysilane represented by the following general formula (1) to be used in this embodiment include tetramethoxysilane, tetraethoxysilane, tetrapropoxysilane, tetrabutoxysilane, and a condensate thereof (n is 2 or more). These can be used alone or by mixing two or more types thereof. Incidentally, compound in which the alkyl group (R) in the general formula (1) has 5 or more carbon atoms is also known, however, such a compound having 5 or more carbon atoms has a slow condensation reaction rate on the surface of the metal pigment, and therefore is not practical.

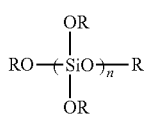  (1)

(In the formula, R represents an alkyl group having 1 to 4 carbon atoms, and n represents a number of 1 to 20.)

(Compound Represented by General Formula (2))

The organoalkoxysilane represented by the following general formula (2) to be used in this embodiment is cocondensed with the alkoxysilane represented by the general formula (1) on the surface of the metal pigment and serves as a constituent component of the coating layer, and also, when any of a variety of resins (binders) is blended as an ink, can improve the adhesiveness to the resin (binder) by contained organic functional group. Further, the organoalkoxysilane represented by the general formula (2) may be used alone.

  (2)

(In the formula, $R^1$ represents a monovalent group having a hydrogen atom or a functional group selected from an alkyl group, an alkenyl group, a glycidoxy group, an epoxycycloalkyl group having 5 or 6 carbon atoms, a (meth)acryl group, an amino group, a mercapto group, and an isocyanate group; $R^2$ represents a group selected from an alkyl group having 1 to 4 carbon atoms and a phenyl group; $R^3$ represents a monovalent alkyl group having 1 to 4 carbon atoms; and a represents 0, 1, or 2.)

Therefore, the organoalkoxysilane represented by the general formula (2) may be suitably selected according to the resin (binder) to be used and is not particularly limited, however, specific examples thereof include trimethoxysilane, triethoxysilane, tripropoxysilane, methyldimethoxysilane, methyldiethoxysilane, dimethylmethoxysilane, dimethylethoxysilane, dimethylpropoxysilane, hexyltrimethoxysilane, hexyltriethoxysilane, hexyltripropoxysilane, vinyltrimethoxysilane, vinyltriethoxysilane, vinyldimethylmethoxysilane, vinyldimethylethoxysilane, methylvinyldimethoxysilane, methylvinyldiethoxysilane, allyldimethylmethoxysilane, allyldimethylethoxysilane, 3-glycidoxypropyltrimethoxysilane, 3-glycidoxypropyltriethoxysilane, 5,6-epoxyhexyltrimethoxysilane, 5,6-epoxyhexyltriethoxysilane, 2-(3,4-epoxycyclohexyl)ethyltrimethoxysilane, 2-(3,4-epoxycyclohexyl)ethyltriethoxysilane, 3-acryloxypropyltrimethoxysilane, 3-acryloxypropyltriethoxysilane, 3-methacryloxypropyltrimethoxysilane, 3-methacryloxypropyltriethoxysilane, N-(2-aminoethyl)-3-aminopropyltrimethoxysilane, N-(2-aminoethyl)-3-aminopropyltriethoxysilane, 3-aminopropyltrimethoxysilane, 3-aminopropyltriethoxysilane, 3-mercaptopropylmethyldimethoxysilane, and 3-mercaptopropylmethyldiethoxysilane. These can be used alone or by mixing two or more types thereof.

(Compound Represented by General Formula (3))

The metal alkoxide represented by the following general formula (3) to be used in this embodiment is copolymerized with the alkoxysilane represented by the general formula (1) or the organoalkoxysilane represented by the general formula (2), or three-dimensionally cocondensed with the alkoxysilane represented by the general formula (1) and the organoalkoxysilane represented by the general formula (2), and is added for the purpose of improving the environmental resistance such as weather resistance, acid resistance, alkali resistance, and salt water resistance of the obtained metal pigment.

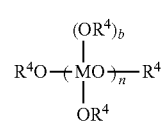  (3)

(In the formula, M represents an atom of Ti, Zr or Al; $R^4$ represents an alkyl group having 1 to 10 carbon atoms; b represents 0 or 1; and n represents a number of 1 to 20.)

Depending on the used amount of the metal alkoxide represented by the general formula (3), the hue of the metal pigment is changed. Therefore, the metal alkoxide represented by the general formula (3) can be used for the purpose not only of coating the metal pigment but also coloring the same. Further, the metal alkoxide represented by the general formula (3) has high activity, and functions also as a condensation catalyst (dealcoholization catalyst) for the alkoxysilane represented by the general formula (1) and the organoalkoxysilane represented by the general formula (2). The condensation catalyst (dealcoholization catalyst) will be described later.

Specific examples of the metal alkoxide represented by the general formula (3) include aluminum triisopropylate, aluminum triethylate, aluminum tributyrate, monobutoxyaluminum diisopropylate, titanium tetraisopropoxide, titanium tetrabutoxide, titanium butoxide dimer, titanium tetra-2-ethyl hexoxide, zirconium tetrapropoxide, and zirconium tetrabutoxide.

(Organic Solvent Having No Active Hydrogen)

The surface coating in this embodiment is preferably performed in a state where the metal pigment is dispersed by diluting the metal pigment with an organic solvent, followed by stirring. When an organic solvent having active hydrogen such as water, an alcohol, a primary amine, a secondary amine, a thiol, or a carboxylic acid as the solvent for diluting the metal pigment, the surface of the metal pigment is corroded, or the solvent reacts with the alkoxides represented by the above-described general formulae (1), (2), and (3) serving as the coating components, and therefore, the dealcoholization condensation reaction is inhibited, and thus, the reaction rate is significantly decreased.

Therefore, as the organic solvent to be used in this embodiment, an organic solvent having no active hydrogen is required to be used. Specific examples thereof include aliphatic hydrocarbons, aromatic hydrocarbons, halogenated hydrocarbons, organic acid esters, ethers, and ketones. From the viewpoint of safety and solubility of an alkoxysilane or the like, organic acid esters are preferred.

As the organic acid ester, for example, acetic acid esters such as methyl acetate, ethyl acetate, propyl acetate, butyl acetate, propylene glycol monomethyl ether acetate, ethylene glycol monoethyl ether acetate, ethyl-3-ethoxy propionate, 3-methoxybutyl acetate, and 3-methyl-3-methoxybutyl acetate are easily available and therefore are preferred. Among these, water-soluble esters such as propylene glycol monomethyl ether acetate and ethylene glycol monoethyl ether acetate are preferred because a reaction mixture can be directly used in both of an oily ink and an aqueous ink.
(Dealcoholization Catalyst)

The dealcoholization condensation reaction of the alkoxysilane represented by the general formula (1) or the organoalkoxysilane represented by the general formula (2) proceeds even in the absence of a catalyst, however, the reaction rate is generally slow, and therefore such a condition is not practical. The dealcoholization catalyst to be used in this embodiment is added for accelerating the dealcoholization condensation reaction of the alkoxysilane represented by the general formula (1) or the organoalkoxysilane represented by the general formula (2).

Examples of the dealcoholization catalyst include alkyl titanates, metal salts of carboxylic acids such as tin octylate, amine salts such as dimethylamine acetate, quaternary ammonium salts of carboxylic acids such as tetraamine ammonium acetate, amines such as tetramethyl pentamine, amine-based silane coupling agents such as N-β-aminoethyl-γ-aminopropyltrimethoxysilane, acids such as p-toluenesulfonic acid, aluminum alkoxides such as aluminum ethoxide, aluminum chelates such as aluminum ethylacetoacetate diisopropylate, titanium alkoxides such as titanium tetrapropoxide, titanium chelates such as titanium diisopropoxybis(acetylacetonate), zirconium alkoxides such as zirconium tetrapropoxide, and zirconium chelates such as zirconium tetraacetylacetonate.

Among these, from the viewpoint that the catalyst itself serves as the constituent component of the coating layer (coating film) of the metal pigment after finishing the reaction, metal compounds including aluminum alkoxides such as aluminum ethoxide, aluminum chelates such as aluminum ethylacetoacetate diisopropylate, titanium alkoxides such as titanium tetrapropoxide, titanium chelates such as titanium diisopropoxybis(acetylacetonate), zirconium alkoxides such as zirconium tetrapropoxide, and zirconium chelates such as zirconium tetraacetylacetonate, and the like are preferred. In particular, aluminum alkoxides, titanium alkoxides, and zirconium alkoxides, which are metal alkoxides represented by the general formula (3) not only function as a condensation catalyst, but also can impart acid resistance, alkali resistance, and the like to the coating film, and therefore are preferred.

[Surface Coating Treatment]

As the surface coating treatment, the above-described components, that is, the metal pigment, and the alkoxysilane represented by the general formula (1) or the organoalkoxysilane represented by the general formula (2), and the organic solvent having no active hydrogen, and the dealcoholization catalyst are mixed. The mixing method is not particularly limited, and for example, first, a treatment solution is prepared, and then, the metal pigment is added thereto and mixed by stirring to form a reaction mixture, and a reaction can be allowed to proceed therein.

The concentration of the metal pigment in the reaction mixture is generally preferably from 1 to 40% by mass. A too low concentration is uneconomical, and a too high concentration may deteriorate the uniformity of the reaction. The used amount of the alkoxysilane represented by the general formula (1) or the organoalkoxysilane represented by the general formula (2) is preferably from 5 to 50 parts by mass with respect to 100 parts by mass of the metal pigment. A too low used amount of the alkoxysilane represented by the general formula (1) or the organoalkoxysilane represented by the general formula (2) may cause insufficient coating of the metal pigment. On the other hand, a too high used amount is uneconomical, and also may deteriorate the brightness of the product to be obtained.

When the alkoxysilane represented by the general formula (1) and the organoalkoxysilane represented by the general formula (2) are used in combination, the total used amount thereof is from 5 to 50 parts by mass with respect to 100 parts by mass of the metal pigment in the same manner as described above. As for the blending ratio between the alkoxysilane represented by the general formula (1) and the organoalkoxysilane represented by the general formula (2), the amount of the organoalkoxysilane represented by the general formula (2) is in the range from 5 to 200 parts by mass with respect to 100 parts by mass of the alkoxysilane represented by the general formula (1). If the used amount of the organoalkoxysilane represented by the general formula (2) is too low, the adhesiveness to the resin (binder) is not significant, on the other hand, if the used amount thereof is too high, the strength of the coating film is deteriorated, and the water resistance and chemical resistance of the metal pigment are in sufficient.

Further, by using the metal alkoxide represented by the general formula (3) in combination, in addition to the alkoxysilane represented by the general formula (1) and the organoalkoxysilane represented by the general formula (2), an effect of improving the chemical resistance, particularly acid resistance and alkali resistance is obtained. By using the metal alkoxide represented by the general formula (3) in combination, a metal pigment coated with a cocondensate thereof with the alkoxysilane represented by the general formula (1) or the organoalkoxysilane represented by the general formula (2), or a three-dimensional cocondensate thereof with the alkoxysilane represented by the general formula (1) and the organoalkoxysilane represented by the general formula (2) is obtained.

When the metal alkoxide represented by the general formula (3) is used in combination with the alkoxysilane represented by the general formula (1) or the organoalkoxysilane represented by the general formula (2), or in combination with the alkoxysilane represented by the general formula (1) and the organoalkoxysilane represented by the general formula (2), the total used amount thereof is from 5 to 50 parts by mass with respect to 100 parts by mass of the metal pigment in the same manner as described above. As for the blending ratio between the alkoxysilane represented by the general formula (1) or the organoalkoxysilane represented by the general formula (2) and the metal alkoxide represented by the general formula (3), the amount of the metal alkoxide represented by the general formula (3) is from 1 to 50 parts by mass with respect to 100 parts by mass of the alkoxysilane represented by the general formula (1) or the organoalkoxysilane represented by the general formula (2). If the used amount of the metal alkoxide represented by the general formula (3) is too low, the above-described effect is not significant, on the other hand, if the used amount is too high, the coating film forming reaction is not uniform.

The used amount of the dealcoholization catalyst is preferably from 0.1 to 5 parts by mass with respect to 100 parts by mass of the alkoxysilane represented by the general formula (1) or the organoalkoxysilane represented by the general formula (2). A too low used amount of the dealcoholization catalyst is uneconomical because a long time is required for the reaction. On the other hand, even if the used amount is too high, there is not a particular advantageous effect on the reaction. The reaction temperature is preferably from 40° C. to 90° C. A too low reaction temperature is uneconomical because a long time is required for the reaction. On the other hand, if the reaction temperature is too high, the uniformity of the coating film may be impaired.

The coating reaction of this embodiment is generally slow, and the reaction time is generally from 4 to 8 hours, although varying depending on the reaction temperature. If the reaction time is too short, the condensation reaction of the alkoxide is insufficient, and thus the durability of the formed coating film may be insufficient in some cases. On the other hand, a too long reaction time is uneconomical. The reactions can be carried out in an air atmosphere or in an inert gas atmosphere such as in a nitrogen gas atmosphere under normal pressure. Incidentally, in order to complete the reaction and also form a dense and uniform coating film, after finishing the reaction, aging is preferably carried out at an arbitrary temperature, preferably at a temperature of 15 to 30° C. for 7 to 30 days.

Further, after finishing the reaction, preferably after aging, the reaction mixture is filtered. The resulting residue is preferably directly stored in a paste state and used as the ink component, however, the paste obtained after filtration may be dried after being washed with a lower alcohol such as methanol or a low-boiling solvent such as acetone.

By performing such a coating treatment, the surface of the metal pigment is coated with a condensate of the alkoxysilane represented by the general formula (1) or the organoalkoxysilane represented by the general formula (2), a cocondensate of the alkoxysilane represented by the general formula (1) and the organoalkoxysilane represented by the general formula (2), a cocondensate of the alkoxysilane represented by the general formula (1) or the organoalkoxysilane represented by the general formula (2) and the metal alkoxide represented by the general formula (3), or a three-dimensional cocondensate of the alkoxysilane represented by the general formula (1), the organoalkoxysilane represented by the general formula (2), and the metal alkoxide represented by the general formula (3). These coating films are not merely assemblies of silica fine particles, but dense and transparent (co)condensates of the above-described compounds, and thus, the obtained metal pigment has excellent brightness, and also has excellent water resistance and chemical resistance such as acid resistance and alkali resistance, and also is less susceptible to discoloration or color fading even under high temperature and high humidity conditions, can also endure the long-term use under outdoor conditions, and therefore is useful as a starting material of a metallic ink required to have metallic luster. Further, by the coating with the above-described coating film, the electrical conductivity of the metal pigment can be largely decreased, and therefore, the metal pigment is particularly useful as a starting material of a piezoelectric inkjet ink.

[Preparation of Inkjet Ink]

The inkjet ink according to this embodiment can be prepared by adding a solvent to the metal pigment subjected to the above-described surface treatment, followed by stirring, and further adding a resin thereto, followed by stirring. Incidentally, a dispersant may be added as needed.

(Solvent)

The non-conductive metal pigment according to this embodiment has high stability over time because the surface of the metal pigment is less susceptible to corrosion or the like in the ink, and therefore, a solvent to be used in the inkjet ink is not particularly limited, however, a solvent which has no fear of causing corrosion is preferably used. Examples of such a solvent include solvents having no active hydrogen, and specific examples thereof include aliphatic hydrocarbons, aromatic hydrocarbons, halogenated hydrocarbons, organic acid esters, ethers, and ketones. From the viewpoint of safety and solubility of an alkoxysilane or the like, organic acid esters are preferred. Specifically, for example, acetic acid esters such as methyl acetate, ethyl acetate, propyl acetate, butyl acetate, propylene glycol monomethyl ether acetate, ethylene glycol monoethyl ether acetate, ethyl-3-ethoxy propionate, 3-methoxybutyl acetate, and 3-methyl-3-methoxybutyl acetate are easily available and therefore are preferred. Moreover, water-soluble esters such as propylene glycol monomethyl ether acetate and ethylene glycol monoethyl ether acetate are preferred because a reaction mixture can be directly used in all of an oily paint, an oily ink, an aqueous paint, and an aqueous ink.

(Resin (Polymer))

The resin to be used in the inkjet ink of this embodiment is not particularly limited as long as the resin is dissolved or dispersed in the above-described solvent to be blended in the ink. Specific examples thereof include an acrylic resin, a polyester resin, a phenolic resin, a polyamide, polyvinyl butyral, cellulose acetate butyrate, a nitrocellulose resin, a polyurethane, and a vinyl chloride-vinyl acetate copolymer. These can be used alone or by mixing two or more types thereof. The type of resin may be selected according to the type of solvent.

EXAMPLES

Hereinafter, embodiments will be described in detail with reference to Examples and Comparative Examples, however, it will be appreciated that the embodiments are not limited to the following Examples. Incidentally, "part(s)" and "%" described below are all based on mass unless otherwise specified.

Preparation Example of Surface-Coated Aluminum Pigment (Non-Conductive Metal Pigment)

In a 500-mL round-bottom flask equipped with a stirrer and a condenser, 100 parts of an aluminum paste (METASHEEN 71-0010), 100 parts of propylene glycol monomethyl ether acetate, and 2 parts of 3-glycidoxypropyltrimethoxysilane were mixed by stirring, and thereafter, 0.1 parts of zirconium tetrabutoxide was added thereto, and the resulting mixture was stirred at 60° C. in a hot water bath for 5 hours. Thereafter, the mixture was cooled to room temperature, and then transferred to a glass bottle. The bottle was hermetically sealed and left to stand for 20 days, whereby a surface-coated aluminum pigment paste having an aluminum concentration of 5% was obtained. A portion of the obtained paste was taken out and dried at 150° C. for 2 hours, and then observed with an electron microscope. As a result, the surface of the aluminum pigment particle was coated with a transparent condensate of 3-glycidoxypropyltrimethoxysilane and was uniformly flat.

Incidentally, the average particle diameter of the obtained pigment was measured using a laser diffraction particle size analyzer (SALD-7000, manufactured by Shimadzu Corporation).

(Measurement Test for Electrical Conductivity)

By using the surface-coated aluminum pigment prepared according to the above-described preparation example, a 1% aluminum slurry in MIBK solution was prepared, and the prepared slurry solution was applied by spraying to an acrylic plate (100×100 mm), followed by drying. Then, the surface resistance thereof was measured using Hiresta-UP MCP-HT450 (manufactured by Mitsubishi Chemical Analytech Co., Ltd., measurement range: $10^4$ to $10^{13}\Omega$). The measurement results are shown in Table 1.

TABLE 1

| | with surface coating film |
|---|---|
| Particle diameter (nm) | 632 |
| Electrical conductivity [($\Omega \cdot$ cm)$^{-1}$] | $1 \times 10^{-13}$ or less |

As shown in Table 1, the electrical conductivity of the aluminum pigment in which the surface of aluminum was coated with a continuous coating film composed of an alkoxide including an alkoxysilane was found to be as low as $1 \times 10^{-13}$ ($\Omega \cdot$cm)$^{-1}$.

Examples 1 to 3, Reference Examples 1-17

After an aluminum pigment was subjected to a coating treatment according to the method shown in the above-described Preparation Example except that the addition amount or type of the alkoxysilane was changed, an organic solvent and a suitable amount of a dispersant were added thereto, followed by stirring. Further a resin was added thereto, followed by stirring, whereby the respective inkjet inks of Examples 1 to 3 and Reference Examples 1 to 17 were prepared. The blending ratios of the respective components of Examples 1 to 3 and Reference Examples 1 to 17 are shown in the following Tables 2 to 4.

Comparative Examples 1 and 2

The respective inkjet inks of Comparative Examples 1 and 2 were prepared in the same manner as in Example 1 except that an aluminum pigment which was not subjected to the coating treatment was used. The blending ratios of the respective components of Comparative Examples 1 and 2 are shown in the following Table 4.
[Evaluation of Inkjet Ink]
The evaluation using an inkjet recording apparatus was performed as follows by paying attention to the relationship between the type of alkoxysilane used in the surface-coated aluminum pigment and the quality of an image on a medium obtained by printing or the glossiness thereof.

With respect to printed media (glossy paper, manufactured by Mitsubishi Paper Mills Limited.) on which printing was performed using each of the above-prepared inks of Examples 1 to 3 and Reference Examples 1 to 17 and Comparative Examples 1 and 2, glossiness, fixability, and the number of print missing lines were evaluated. The evaluation results depending on the types of functional group in $R^1$ of the organoalkoxysilane are shown in Tables 2 to 4. Incidentally, the evaluation tests are performed as follows.
(Measurement of Glossiness)
The glossiness at an incident angle of 20° was measured using a gloss meter PG-1M (manufactured by Nippon Denshoku Industries Co., Ltd.).
(Measurement of Fixability)
By using a rubbing tester for color fastness (NR-100, manufactured by Daiei Kagaku Seiki MFG. Co., Ltd.), a print was rubbed by reciprocating a rubbing material 5 times at a load of 500 g, and thereafter, a print defect was observed. Incidentally, as the rubbing material, a PPC pad manufactured by Dynic Corporation was used. The evaluation criteria are as follows.
1: A rubbed portion of the print is completely erased.
3: The print is partially erased.
5: The print is not at all erased.
(Number of Print Missing Lines)
Average number at ±2 V:
Print missing lines were counted when applying each of the following five different voltages: a voltage at which 42 pL of an ink was discharged (prescribed voltage), voltages which are the prescribed voltage±2 V, and voltages which are the prescribed voltage±1 V, and an average number of print missing lines was calculated.
Average number in 10 continuously printed sheets at 0V:
Print missing lines were counted in 10 continuously printed sheets when applying a voltage at which 42 pL of an ink was discharged (prescribed voltage), and an average number of print missing lines was calculated.

TABLE 2

| | | Reference Example 4 | Reference Example 5 | Reference Example 6 | Reference Example 7 | Reference Example 8 | Reference Example 9 | Reference Example 10 |
|---|---|---|---|---|---|---|---|---|
| Aluminum pigment | % | 1 | 1 | 1 | 1 | 1 | 1 | 1 |
| 2-[2-(2-ethylhexyloxy)ethoxy]ethanol | % | 84 | 84 | 0 | 84 | 84 | 84 | 84 |
| Tetraethylene glycol monomethyl ether | % | 0 | 0 | 84 | 0 | 84 | 0 | 0 |
| Propylene glycol monomethyl ether acetate | % | 14 | 0 | 14 | 0 | 14 | 14 | 0 |
| Diethyl diglycol | % | 0 | 14 | 0 | 14 | 0 | 0 | 14 |
| Polymer (polyester) | % | 0.3 | 0.5 | 1 | 0.5 | 1 | 0.3 | 0.3 |
| Organoalkoxysilane — Functional group in $R^1$ | — | Acryl | Acryl | Acryl | Acryl | Acryl | Acryl | Epoxy |
| Addition amount*1 | — | 1.2 | 1.2 | 1.2 | 2 | 2 | 2 | 1.2 |
| Dispersant | % | 0.05 | 0.1 | 0.2 | 0.05 | 0.1 | 0.2 | 0.2 |
| Average particle diameter | μm | 0.95 | 0.92 | 0.95 | 0.98 | 0.87 | 0.88 | 1.31 |
| Print missing lines (Average number at ±2 V). | Number of lines | 3.2 | 2.8 | 3.4 | 5.8 | 0.4 | 2.0 | 6.6 |
| Print missing lines (Average number in 10 continuously printed sheets at 0 V) | Number of lines | 3.4 | 2.5 | 2.8 | 7.6 | 0.6 | 0.8 | 5.9 |
| Glossiness | — | 410 | 404 | 355 | 221 | 242 | 253 | 207 |
| Fixability | — | 3 | 3 | 1 | 3 | 1 | 3 | 3 |

[Note]
*1 The addition amount is expressed as a ratio when the smallest amount for coating the surface of the aluminum pigment is taken as 1.

TABLE 3

|  |  | Reference Example 11 | Reference Example 13 | Example 1 | Example 2 | Reference Example 14 | Reference Example 15 | Reference Example 16 |
|---|---|---|---|---|---|---|---|---|
| Aluminum pigment | % | 1 | 1 | 1 | 1 | 1 | 1 | 1 |
| 2-[2-(2-ethylhexyloxy)ethoxy]ethanol | % | 0 | 0 | 84 | 84 | 0 | 84 | 84 |
| Tetraethylene glycol monomethyl ether | % | 84 | 84 | 0 | 0 | 84 | 0 | 0 |
| Propylene glycol monomethyl ether acetate | % | 14 | 14 | 14 | 0 | 14 | 14 | 0 |
| Diethyl diglycol | % | 0 | 0 | 0 | 14 | 0 | 0 | 14 |
| Polymer (polyester) | % | 0.5 | 0.5 | 1 | 0.3 | 0.3 | 0.5 | 1 |
| Organoalkoxysilane  Functional group in $R^1$ | — | Epoxy | Acryl + Epoxy | Acryl + Epoxy | Acryl + Epoxy | Acryl + Epoxy | Acryl + Epoxy | Acryl + Epoxy |
| Addition amount*1 | — | 1.2 | 1.2 | 1.2 | 1.2 | 2 | 2 | 2 |
| Dispersant | % | 0.05 | 0.2 | 0.05 | 0.1 | 0.1 | 0.2 | 0.05 |
| Average particle diameter | μm | 0.89 | 0.84 | 0.91 | 0.94 | 0.95 | 1.07 | 1.06 |
| Print missing lines (Average number at ±2 V) | Number of lines | 3.6 | 6.0 | 1.0 | 2.0 | 4.4 | 2.0 | 5.6 |
| Print missing lines (Average number in 10 continuously printed sheets at 0 V) | Number of lines | 2.4 | 4.7 | 1.2 | 1.5 | 3.8 | 1.6 | 3.0 |
| Glossiness | — | 394 | 335 | 435 | 403 | 279 | 309 | 347 |
| Fixability | — | 1 | 1 | 3 | 3 | 1 | 3 | 5 |

[Note]
*1 The addition amount is expressed as a ratio when the smallest amount for coating the surface of the aluminum pigment is taken as 1.

TABLE 4

|  |  | Example 3 | Reference Example 17 | Reference Example 12 | Reference Example 1 | Reference Example 2 | Reference Example 3 | Comparative Example 1 | Comparative Example 2 |
|---|---|---|---|---|---|---|---|---|---|
| Aluminum pigment | % | 1 | 1 | 1 | 1 | 1 | 1 | 1 | 1 |
| 2-[2-(2-ethylhexyloxy)ethoxy]ethanol | % | 84 | 84 | 84 | 84 | 0 | 84 | 0 | 84 |
| Tetraethylene glycol monomethyl ether | % | 0 | 0 | 0 | 0 | 84 | 0 | 84 | 0 |
| Propylene glycol monomethyl ether acetate | % | 14 | 14 | 14 | 0 | 14 | 14 | 14 | 14 |
| Diethyl diglycol | % | 0 | 0 | 0 | 14 | 0 | 0 | 0 | 0 |
| Polymer (polyester) | % | 0.3 | 1 | 1 | 1 | 0.3 | 0.5 | 0.3 | 0.5 |
| Organoalkoxysilane  Functional group in $R^1$ | — | Acryl + Epoxy | Acryl + Epoxy | Epoxy | Hexyl | Hexyl | Hexyl | — | — |
| Addition amount*1 | — | 3.0 | 1.2 | 1.2 | 1.2 | 1.2 | 1.2 | — | — |
| Dispersant | % | 0.05 | 0 | 0.1 | 0.2 | 0.05 | 0.1 | 0.05 | 0.1 |
| Average particle diameter | μm | 0.60 | 1.10 | 0.87 | 1.68 | 1.50 | 2.03 | 0.91 | 0.91 |
| Print missing lines (Average number at ±2 V) | Number of lines | 0.2 | 6.8 | 2.8 | 25.2 | 11.6 | 48.0 | Not discharged | Not discharged |
| Print missing lines (Average number in 10 continuously printed sheets at 0 V) | Number of lines | 0.4 | 3.5 | 2.0 | 23.7 | 10.4 | 50.0 | Not discharged | Not discharged |
| Glossiness | — | 352 | 358 | 322 | 115 | 119 | 46 | — | — |
| Fixability | — | 3 | 5 | 5 | 5 | 1 | 3 | — | — |

[Note]
*1 The addition amount is expressed as a ratio when the smallest amount for coating the surface of the aluminum pigment is taken as 1.

The evaluation results shown in Tables 2 to 4 show that in the case of Examples 1 to 3 and Reference Examples 1 to 17 in which the surface-coated aluminum pigment according to this embodiment was used, printing by an inkjet recording apparatus can be performed, however, in the case of Comparative Examples 1 and 2 in which the aluminum pigment without being subjected to surface coating was used, the pigment is affected by the electrical charge of the piezoelectric element in the inkjet head, and thus, printing by an inkjet recording apparatus cannot be performed.

Further, in Examples, when the average particle diameter of the pigment is larger than 1.5 μm, the number of print missing lines tends to increase, and also the glossiness tends to decrease, however, the inks can sufficiently endure printing by an inkjet recording apparatus.

Further, as compared with Examples in which tetraethylene glycol monomethyl ether was blended in the solvent, the fixability was more favorable in Examples in which 2-[2-(2-ethylhexyloxy)ethoxy]ethanol, propylene glycol monomethyl ether acetate, or diethyl diglycol was blended in the solvent. Further, in Examples in which 2-[2-(2-ethylhexyloxy)ethoxy]ethanol, propylene glycol monomethyl ether acetate, or diethyl diglycol was blended, as the addition amount of the polymer was increased, the fixability was improved.

Further, the use of an acryl group or an epoxy group, or the combination use of an acryl group and an epoxy group as the functional group in $R^1$ of the organoalkoxysilane provided favorable results that the number of print missing lines was lower. In addition, the use of an acryl group or the combination use of an acryl group and an epoxy group as the functional group in $R^1$ of the organoalkoxysilane was preferred, and more favorable glossiness was obtained when the addition amount of the alkoxysilane for the aluminum pigment was 1.2 than 2.

The inkjet ink of this embodiment has high brightness and also has excellent water resistance, chemical resistance, whether resistance, and so on, and also is less susceptible to discoloration or color fading even under high temperature and high humidity conditions, and therefore can also endure the long-term use under outdoor conditions.

Further, the inkjet ink of this embodiment is not affected by the electrical charge of a piezoelectric element in an inkjet head, and therefore, abnormal discharge of the ink due to the effect of the electrical charge or breakdown of the piezoelectric element itself due to electrical conduction in the ink does not occur.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An inkjet ink, comprising a non-conductive metal pigment, a resin, and a solvent, wherein
the average particle diameter of the non-conductive metal pigment is 0.4 or more and less than 0.95 μm,
the surface of the non-conductive metal pigment is coated with a coating film made of an alkoxide including an organoalkoxysilane having a structure represented by the following general formula (2a) and an organoalkoxysilane having a structure represented by the following general formula (2b),
the coating film has a crosslinked structure,
a glossiness of an image on a medium obtained by printing is in the range from 352 to 435 at an incident angle of 20,
an average number of print missing lines at ±2 V is in the range from 0.2 to 2, and
a fixability to a printed media is equal to the state that the print is partially erased at a rubbing test for color fastness;

$$R^1\text{—}Si\text{—}(OR^3)_3 \tag{2a}$$

wherein $R^1$ in the general formula (2a) represents a monovalent group having a (meth)acryl group, $R^3$ in the general formula (2a) represents a monovalent alkyl group having 1 to 4 carbon atoms, $$R^1\text{—}Si\text{—}(OR^3)_3 \tag{2b}$$

wherein $R^1$ in the general formula (2b) represents a monovalent group having a functional group selected from a glycidoxy group, and an epoxycycloalkyl group having 5 or 6 carbon atoms, $R^3$ in the general formula (2b) represents a monovalent alkyl group having 1 to 4 carbon atoms.

2. The ink according to claim 1, wherein the ratio of the addition amount of the resin to that of the non-conductive metal pigment is from 0.3 to 1 part with respect to 1 part of the pigment.

3. The ink according to claim 1, wherein the alkoxide further includes organoalkoxysilane having a structure represented by the following general formula (2):

$$R^1R^2_a\text{—}Si\text{—}(OR^3)_{3-a} \tag{2}$$

wherein $R^1$ in the general formula 2 represents a monovalent group having a hydrogen atom or a functional group selected from an alkyl group, an alkenyl group, an amino group, a mercapto group, and an isocyanate group; $R^2$ represents a group selected from an alkyl group having 1 to 4 carbon atoms and a phenyl group; $R^3$ represents a monovalent alkyl group having 1 to 4 carbon atoms; and a represents 0, 1, or 2.

4. The ink according to claim 3, wherein the non-conductive metal pigment has an electrical conductivity of $10^{-13}$ $(\Omega\cdot cm)^{-1}$ or less.

5. The ink according to claim 3, wherein the addition amount of the alkoxide is 1 to 3 times the smallest amount for coating the surface of the metal pigment, which is taken as 1.

6. The ink according to claim 3, wherein the resin is at least one resin selected from an acrylic resin, a polyester resin, a phenolic resin, a polyamide, polyvinyl butyral, cellulose acetate butyrate, a nitrocellulose resin, a polyurethane, a vinyl chloride-vinyl acetate copolymer, and a resin emulsion thereof.

7. The ink according to claim 3, wherein the non-conductive metal pigment is a metal composed mainly of aluminum.

8. The ink according to claim 3, wherein the non-conductive metal pigment has a scaly shape.

9. The ink according to claim 3, wherein the addition amount of the resin is from 0.3 mass % to 1 mass %.

10. The ink according to claim 3, wherein the addition amount of the non-conductive metal pigment is at least 0.5 mass % or more.

11. The ink according to claim 3, wherein the alkoxide further includes a metal alkoxide represented by the following general formula (3):

$$R^4O\text{—}(\underset{\underset{OR^4}{|}}{\overset{\overset{(OR^4)_b}{|}}{M}O})_n\text{—}R^4 \tag{3}$$

wherein M represents an atom of Ti, Zr or Al; $R^4$ represents an alkyl group having 1 to 10 carbon atoms; b represents 0 or 1; and n represents a number of 1 to 20.

12. The ink according to claim 11, wherein the addition amount of the alkoxide is 1 to 3 times the smallest amount for coating the surface of the metal pigment, which is taken as 1.

13. The ink according to claim 3, wherein the solvent is an organic solvent having no active hydrogen, and is at least one organic solvent selected from an aliphatic hydrocarbon, an aromatic hydrocarbon, a halogenated hydrocarbon, an organic acid ester, an ether, and a ketone.

14. The ink according to claim 13, wherein the non-conductive metal pigment has an electrical conductivity of $10^{-13}$ $(\Omega\cdot cm)^{-1}$ or less.

15. The ink according to claim 13, wherein the addition amount of the alkoxide is 1 to 3 times the smallest amount for coating the surface of the metal pigment, which is taken as 1.

* * * * *